(12) United States Patent
Einecke et al.

(10) Patent No.: US 9,883,114 B2
(45) Date of Patent: Jan. 30, 2018

(54) CONTROL SYSTEM FOR AN AUTONOMOUS GARDEN TOOL, METHOD AND APPARATUS

(71) Applicant: HONDA RESEARCH INSTITUTE EUROPE GMBH, Offenbach/Main (DE)

(72) Inventors: Nils Einecke, Offenbach (DE); Mathias Franzius, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 440 days.

(21) Appl. No.: 14/506,805

(22) Filed: Oct. 6, 2014

(65) Prior Publication Data

US 2015/0138339 A1 May 21, 2015

(30) Foreign Application Priority Data

Nov. 19, 2013 (EP) .................................... 13193495

(51) Int. Cl.
*H04N 5/235* (2006.01)
*H04N 5/232* (2006.01)
(Continued)

(52) U.S. Cl.
CPC ......... *H04N 5/2355* (2013.01); *A01D 34/008* (2013.01); *B60L 11/1838* (2013.01); *H04N 5/23229* (2013.01); *H04N 5/23245* (2013.01); *B60L 2200/22* (2013.01); *B60L 2260/32* (2013.01); *Y02T 10/7005* (2013.01);
(Continued)

(58) Field of Classification Search
None
See application file for complete search history.

(56) References Cited

U.S. PATENT DOCUMENTS

| 6,009,233 A | * | 12/1999 | Tsujimura | H04N 5/772 386/224 |
| 2007/0041636 A1 | * | 2/2007 | Yoon | G06T 5/009 382/169 |

(Continued)

FOREIGN PATENT DOCUMENTS

EP 2620050 A1 7/2013

OTHER PUBLICATIONS

European Search Report dated Apr. 25, 2014 corresponding to European Patent Application No. 13193495.2.
(Continued)

*Primary Examiner* — Frederick D Bailey
(74) *Attorney, Agent, or Firm* — Squire Patton Boggs (US) LLP

(57) ABSTRACT

The invention relates to a control system for an autonomous garden tool that is equipped with at least one camera and one motor. The control system comprises a camera control module and an image generation module. With the camera control module the camera settings are controlled that are used for capturing images. With the image generation module two consecutive images in a sequence of images that is captured by the camera is determined whereby theses two consecutive images are captured on the basis of different camera settings. The two determined pictures are used as a basis for generating an HDR image in an HDR mode of the control system.

20 Claims, 4 Drawing Sheets

(51) Int. Cl.
*A01D 34/00* (2006.01)
*B60L 11/18* (2006.01)

(52) U.S. Cl.
CPC .......... *Y02T 10/7072* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2007/0248330 A1* | 10/2007 | Pillman | H04N 5/232 386/224 |
| 2009/0086074 A1* | 4/2009 | Li | H04N 5/23245 348/308 |
| 2011/0295636 A1* | 12/2011 | Anderson | G06Q 10/06311 705/7.13 |
| 2013/0128043 A1 | 5/2013 | Avnery | |
| 2013/0195183 A1* | 8/2013 | Zhai | H04N 19/00569 375/240.12 |
| 2013/0330007 A1* | 12/2013 | Kim | G06K 9/46 382/195 |
| 2014/0184852 A1* | 7/2014 | Niemi | H04N 5/2356 348/239 |
| 2016/0360101 A1* | 12/2016 | Venetianer | H04N 5/23219 |

OTHER PUBLICATIONS

Pierre-Jean Lapray et al., "High Dynamic Range Real-Time Vision System for Robotic Applications," IEEE Intelligent Robots and Systems (IROS), Villamoura, Portugal, 2012, version Feb. 1-7, 2013, 5 pages.

\* cited by examiner

CONTROL SYSTEM FOR AN AUTONOMOUS GARDEN TOOL, METHOD AND APPARATUS

BACKGROUND

Field

The present invention relates to a system and method for an autonomous garden tool. Such tool may be a lawn mower. The system and method of the invention are particularly suited for generating an HDR image on the basis of two images out of a sequence of images captured by a camera of the autonomous garden tool.

Description of the Related Art

Technical developments often are intended to increase the comfort of use for the user. Since many people are bothered by gardening work that has to be performed regularly, e.g. lawn mowing, autonomous tools have been developed. With these autonomous garden tools it is no longer necessary for a person to be present when the lawn is mowed. Such lawn mowers have a motor for propelling the lawn mower and furthermore there are detection systems provided in order to avoid that the lawn mower drives through an area where lawn mowing is not needed or wanted. Such areas may be any obstacles that are present on the lawn or may be defined by the edge of an area like the borderline to a terrace. Such edges in the past were marked by an electric border wire which reliably limited the area of movement of the autonomous lawn mower.

For avoiding contact with obstacles that cannot be indicated by such a border wire the autonomous garden tool usually has additional sensors like a bump-sensor and/or a sonar-sensor. But still there is an interest in improving the detection capabilities of small obstacles which may lie on the grass. In particular the bump-sensors are only suitable for obstacles with a minimum height so that the autonomous lawn mower touches the obstacle with its bump-sensor before it turns away and changes the direction of movement. As it can be easily gathered from such a situation it would be preferred if contact with the obstacle can be avoided completely and in particular if the detection of such obstacles could be improved so that a flat item like for example a cellular phone lying in the grass may be detected reliably.

A further known development is therefore to the use of a camera and detection of objects by image processing. Such a system comprising a camera and used in an autonomous lawn mower is described in EP 2 620 050 A1. For adapting the system to different lighting conditions it is suggested in this publication to adapt the setting of the camera. By doing so it is possible to use the system even if lighting conditions are difficult. To further improve it is suggested to use an additional light source that may be switched on if the environment becomes too dark for performing a serious evaluation of a captured image of the camera. Such an adaptation of the camera setting with respect to exposure time and gain can be performed in a time series manner. But there are strong limitations of such system because an image captured by a camera may include dark areas as well as bright areas. Such a situation may for example occur if the lawn mower enters an area where shades of trees in bright sunlight are included in a captured image. The reason is that the dynamic range (intraframe) of a camera sensor typically is limited (about 60 db). Such problem may be solved by using a so-called bracketing technique in which two images taken with different camera settings are combined in order to generate an HDR image.

When HDR images are used for further image processing it has to be ensured that the quality of the HDR image itself is high. There is no sense in generating a HDR image that is improved with respect to the contrast of the image but contains artifacts because of the HDR image generating process. Thus, using the bracketing technique, the time difference between image frames from which the HDR image is calculated should be as short as possible. Otherwise the images that form the basis of the HDR image do not show exactly the same scene. This happens when there is a moving object for example or also when the camera moves.

The use of a FPGA system merging three images captured with different settings is described for robotic applications in "High Dynamic Range Real-Time Vision Systems for Robotic Applications" by Lapray, Heyrman, Rosse and Ginhac.

The problem of such an approach is that the consumer market which is the main market for such autonomous garden tools is very cost-sensitive. Using camera sensors that have the capability of quickly adapting to new camera settings are rather expensive and thus the entire costs for such an autonomous garden tool would increase. And with cameras that apply changed camera settings slower it is not known which image in a sequence of images was captured with which setting. In order to use a low-cost camera sensor having no HDR-functionality, nevertheless, it is suggested in EP 2 620 050 A1 to stop the autonomous lawn mower until two images with different settings are captured. In situations where the contrast changes often while the autonomous garden tool is use this will lead to a significant increase in the time until an area is completely worked.

SUMMARY

Thus, it is an object of the present invention to improve the system so that even when cheap camera sensors are used which cannot ensure a quick adaptation to new camera settings the minimum time necessary for generating an HDR image is ensured.

The above-mentioned problem is solved by the control system, the method and the autonomous lawn mower according to the present invention.

The control system according to the invention is used in an autonomous garden tool such as a lawn mower that is equipped with at least one camera for image capturing and at least one motor for propelling the autonomous garden tool. The control system comprises a camera control module for controlling camera setting. Thereby it is possible to adapt the camera setting to different lighting conditions. Furthermore, the control system comprises an image generation module. In this image generation module two consecutive images in a sequence of images which are captured by the camera on the basis of different camera settings are determined. From these two images an HDR image is generated. Since according to the invention two consecutive images for which different camera settings are used are determined it is not necessary to know for each of the images that are captured which camera settings have been used to capture the respective image. Thus, even if the slow and thus cheap camera sensor is used it is possible to change the camera settings by the camera control module and then without knowing when exactly such change settings become effective determine two consecutive images, one before and one after the change has become effective, in order to generate an HDR image. By using the two consecutive images for generating the HDR image a high quality of the HDR image can be ensured. The determination of consecutive images ensures that images with the smallest time difference available are used to further calculate an HDR image and consequently artifacts are reduced to a minimum.

Preferably, the camera settings that are controlled by the camera control module comprise the exposure time and/or gain and/or aperture of the camera. By doing so it is the easiest way to adapt the camera settings to the lighting conditions. The camera settings are then changed while a series of images is captured. When doing so, it is preferred that after a first picture is captured the settings are changed by the camera control module and then to capture of series of further images. By capturing only one image before the camera control module sets the new setting it is ensured that at least one image is present that used the settings before change even if the camera was reacting fast. Usually, a slow camera will need a while (typically 4-5 frames) to adapt to the new settings and thus even more images are captured using the settings before the change.

Since it is not known a priori which of the sequence of images is taken on the basis of the settings before and after the change, the resulting images are analyzed to determine the time in the sequence when the change of settings is applied. The analysis of the resulting images is made on the basis of mean intensity values of the images of a sequence. Analyzing the resulting images has the advantage that no knowledge about camera settings at the time of image capturing is needed.

Before an HDR image can be calculated from the two determined images it has to be ensured that these two consecutive images are definitely captured using different camera settings so that one of these images is optimized to the darker areas of the image and the other one is optimized to the brighter parts of the image. When such a standard camera which means a camera without inherent HDR capability is used, different camera settings in unchanged lightening conditions necessarily lead to one relatively bright image and one relatively dark image. According to the preferred embodiment of the invention this characteristic is used by calculating the mean intensity values of each of the images of the sequence. It is then possible to compare two consecutively captured images. If the mean intensity value differs more than for example a predetermined value this pair of images defines the jump in the camera settings that have not only been set by the camera control module but in fact became effective in the camera between capturing these two images. Thus, starting from the first picture and comparing its mean intensity values with a mean intensity values of the second picture, comparing the mean intensity values of the second and third picture, comparing the mean intensity values of the third picture and fourth picture and so on until such jump in the mean intensity values is found ensures that a pair of pictures is found that are a suitable basis for generating a high quality HDR image.

To capture a sequence of images and to determine the two pictures that define the jump in the mean intensity value of course needs more time than normal an operation. It is preferred that the speed of movement of the autonomous garden tool is correspondingly adapted. This means that there is a feedback from the image generation module to a movement control module so that the speed can be reduced. The progress can for example be observed by determining the time that is needed for capturing the series of images. When the time that is needed for capturing the images exceeds a threshold than for example the moving control module may totally stop the autonomous garden tool. On the other hand a reduced speed can be used any time the control system switches to the HDR mode.

It is furthermore preferred that the autonomous garden tool and its control system are not only capable of generating HDR images but also to use a single image for further image processing in order to achieve obstacle avoidance or the like. To switch between this regular mode and the HDR mode, it is preferred to determine a contrast in a single captured image and if the contrast in the single captured image exceeds a threshold to switch to an HDR mode. Thus, the additional data processing for generating an HDR image is necessary only in cases where the lighting conditions are in fact difficult. All other situations, where lighting conditions do not lead to a high contrast between different areas of the image, single images captured by the camera can be used. Images having a high contrast in the sense of the inventions are images that have areas that area overexposed and/or areas that are underexposed to such an extent that image processing as desired, e.g. for obstacle avoidance cannot be performed satisfyingly.

It is preferred that the system is adapted to start capturing a new sequence as soon as the two consecutive images of an already captured sequence are determined and further processing of the two determined images and or the HDR image generated there from is performed in parallel with capturing the new sequence. With such a method time during processing can be saved and the overall performance of the system is improved.

The control system and the respective method are preferably used in an autonomous lawn mower but may be used of course in any other autonomous garden tool. The invention in general and in particular details of the invention will be explained now with respect to the appended figures in which

DETAILED DESCRIPTION

The following description and explanation refers to a situation where an autonomous lawn mower is used. Of course it is evident that any details which are discussed in the following may also be used in other autonomous garden tools.

Figure 1:
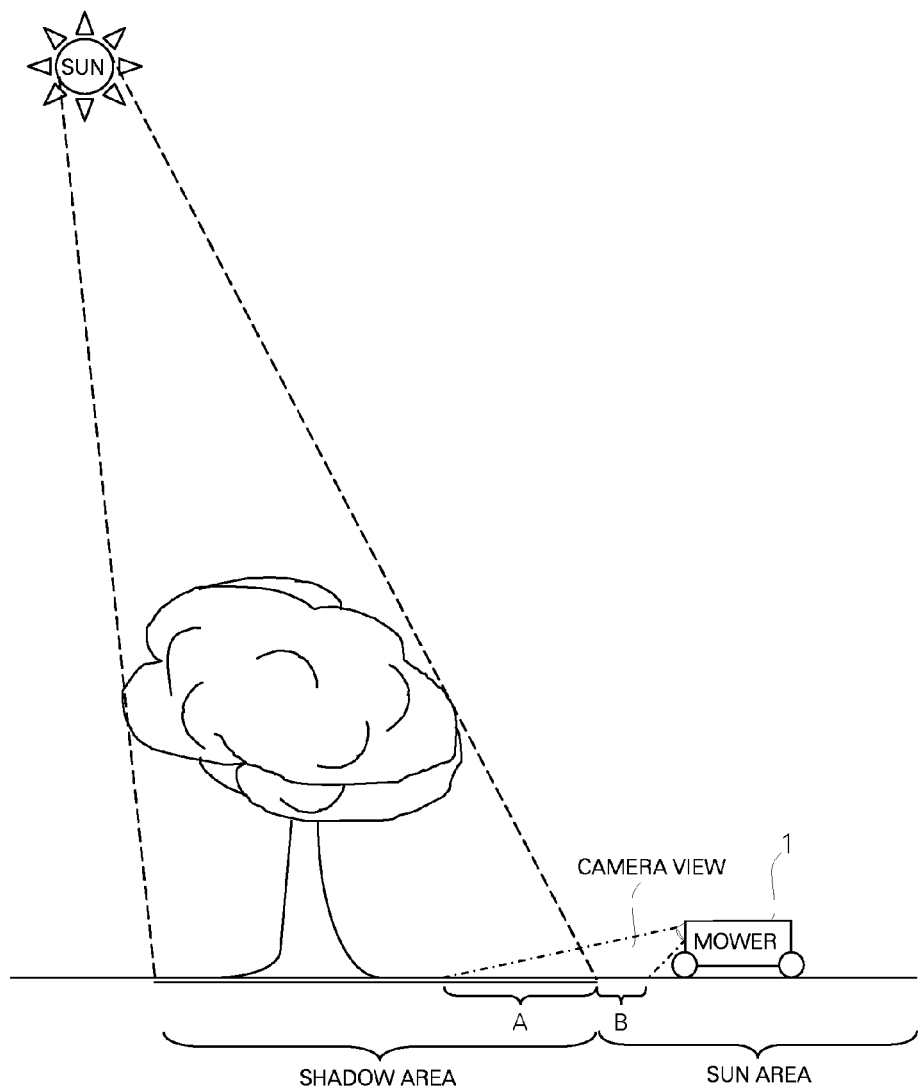
FIG. 1 shows a situation in which generation of an HDR image improves the reliability of the result of image processing.

FIG. 1 shows a situation in which according to previous proposals for obstacle detection problems may occur. Although it is known that camera sensors are used to implement the intelligent functions like obstacle avoidance or grass health recognition sometimes the results of the image processing are poor. The reason for this is that image processing needs a good image quality so that evaluation gives a reliable result. As long as the lighting conditions vary only with respect to time it is no problem to adapt the settings of a camera like exposure time and gain factor. But shown in the situation depicted in FIG. 1 there may also occur situations where a strong contrast within one captured image may occur. For example a tree that casts a strong shadow in summertime when the sun is bright. The camera sensor can only capture one image at a time using the same settings irrespective if a sun area or a shadow area is imaged. In that case the limiting factor is the dynamic range of the camera within one frame. The resulting picture, thus, will have either an underexposed area A and a visible area B when a moderate exposure time or gain is used or a visible area A and an overexposed area B when the exposure time or gain is increased. Since such a poor imaging result will necessarily lead to a bad performance of any function that depends on such an image according to the invention an HDR image is generated on the basis of the two consecutive images that are determined from a sequence of images.

Referring to the above-mentioned example for generating such an HDR image two distinct images are needed. One image captured with a setting like exposure time and gain suitable to result in a visible area A and a second image captured with a camera setting suitable to result in a visible area B. Then, these two images are taken and combined to generate a single HDR image. This HDR image is then used as a basis for further processing of the images and an analysis like obstacle avoidance or grass health recognition. The present invention generates an HDR image without the need of implementing an expensive HDR sensor as a camera and without the need of a camera sensor, for example a CCD- or CMOS-sensor, that quickly applies the camera settings that are received from a camera control module.

Figure 2:
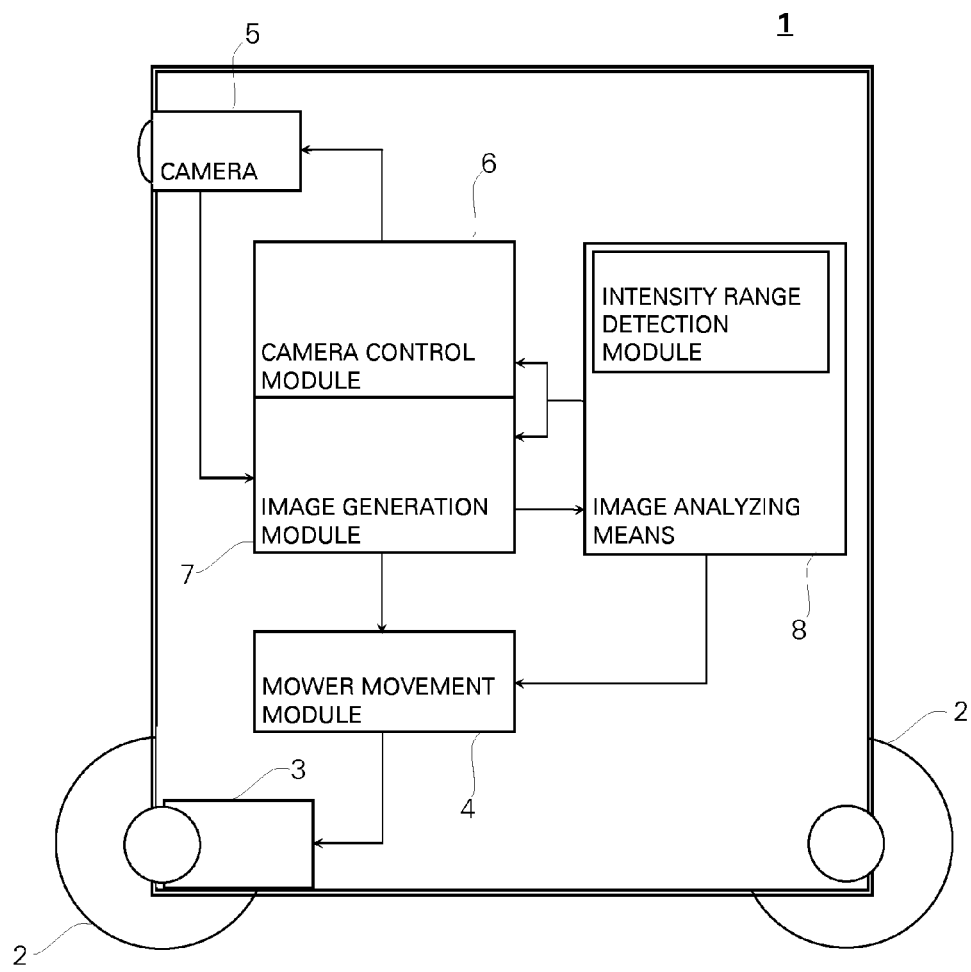
FIG. 2 shows an overview over the control system according to an embodiment of the invention.

According to the present invention it is not necessary to synchronize the camera settings with the captured images since from a series of images that are captured two images captured consecutively on the basis of different settings are determined automatically. An overview over an autonomous lawn mower 1 in which such control system is implemented is given in FIG. 2.

The autonomous lawn mower 1 comprises front and rear wheels 2. At least part of the front and rear wheels is driven by an electric motor 3. The electric motor 3 is controlled by mower movement module 4 so that the direction and speed of the autonomous lawn mower 1 is controlled. Thus, if an obstacle or an edge of an area to be mowed is detected the mower movement module 4 controls the electric motor 3 in such a way that a collision with such an obstacle can be avoided. In the present description only details with respect to an processing of images that are captured by a camera 5 are taken into consideration. Other ways of obstacle detection are well-known in the prior art and may of course also and in addition to the presently presented control system be used in order to provide the mower movement module 4 with information regarding to areas where the autonomous lawn mower may not drive through.

The autonomous lawn mower 1 comprises the camera 5 which is a camera without any HDR capability. But camera 5 is capable of using different settings when capturing images and is therefore connected to a camera control module 6. The camera control module 6 sets camera settings like exposure time and/or gain and/or aperture. The control system according to the invention may be used in two distinct modes. At first there is a regular mode in which the operation of camera 5 is performed as it is known from the prior art using single images. Thus, that automatic control of settings for exposure time and/or gain and/or aperture of the camera is applied in the regular mode. Details for such regular mode are only given as far as they are relevant for the present invention.

Each image that is captured by camera 5 is transferred to an image generation module 7. In the image generation module 7 a preprocessing of the raw data that comes from the camera is performed before the image data which is suitable for further image processing is transferred to an image analyzing means. The image analyzing means 8 performs algorithms for recognition of obstacles or grass health recognition or other analyzes. Furthermore, the image analyzing means 8 comprises an intensity range detection module. This intensity range detection module is capable of analyzing a single frame image in the regular mode so as to determine whether switching to the HDR mode is necessary. As a result of such detection information is transmitted to the camera control module 6 and the image generation module 7 in case that a strong contrast between areas in the captured image of the camera 5 is detected so that further processing might not be possible. As a consequence the camera control module 6 causes the camera 5 to capture a sequence of images and while the sequence of images is captured the camera settings are controlled to change.

According to the present invention only two different camera settings are used. First setting is used to ensure that the image captured by the camera 5 gives a high quality result for example area A accepting that area B is overexposed. The second setting on the other hand ensures that an image where the high quality in the other area, B in the example, is achieved accepting that area A is underexposed. The switch from the first setting to the second setting is performed by the camera control module 6 during capturing the sequence of images by camera 5. The sequence of images captured by camera 5 is transferred to the image generation module 7. The further processing of this sequence of images is explained with respect to FIG. 3, now.

Figure 3:
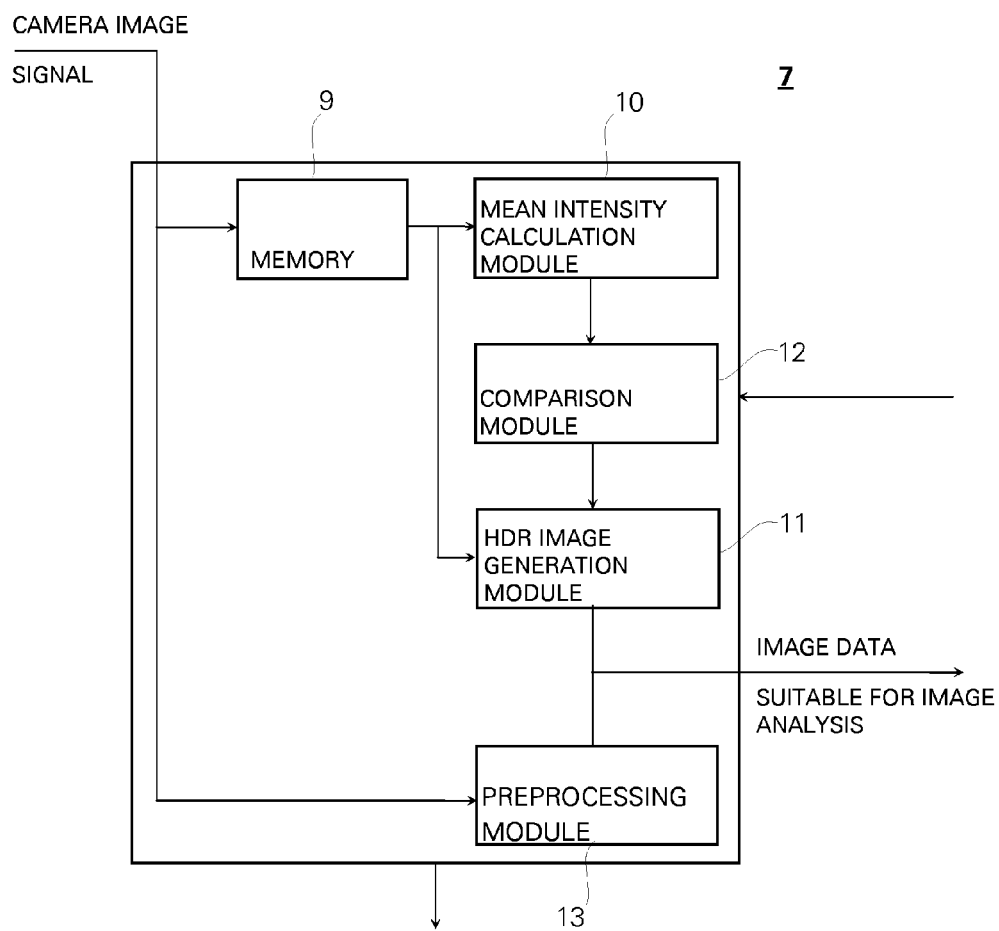
FIG. 3 shows a schematic illustration of the image generation module according to the invention.

A more detailed schematic of the image generation module 7 is shown in FIG. 3. The sequence of images captured by camera 5 is buffered in a memory 9 that is connected to a mean intensity calculation module 10 and an HDR image generation module 11. When a sequence of images is captured by camera 5 and the images are written to memory 9 for each of the captured images a mean intensity value is calculated. Preferably, the calculation of the mean intensity value starts as soon as the first of the sequence of images is stored into the memory. Thus, the processing of the information resulting from the sequence of images and the further capturing of the images may be performed in parallel. As soon as a mean intensity value of a first picture of the sequence and a mean intensity value of a second image of the sequence of images is calculated these two mean intensity values are provided a comparison module 12. In comparison module 12 the mean intensity values of the two consecutive images of the sequence of images are compared. If the comparison gives as a result that the difference between the mean intensity values exceeds a predetermined threshold, the two pictures out of the sequence of pictures are identified as where the transition from image capturing on the basis of the first setting and image capturing on the basis of the second setting occurs. Thus, taking these two pictures for further processing of the captured images ensures that a suitable basis for generating an HDR image is found.

By the mean intensity calculation module 10 the mean intensity values for each of the images of the sequence of images are calculated as long as the pair of images where the jump in the settings occurs is not found. All the mean intensity values that are calculated by the mean intensity calculation module 10 are transmitted to the comparison module 12 consecutively. As soon as the jump in the mean intensity values is detected by the comparison module 12 and thus, the two images that have been captured directly before and directly after the change of the settings became effective in camera 5 capturing the series of images by the camera image signal will be stopped. Furthermore, also the calculation of the mean intensity values of the further images that may already been stored in the memory 9 may be stopped. It is also possible to capture a sequence of images with a fixed number of images, because the rough time that the camera 5 needs to apply a new setting is known. It is for example 4-5 frames, therefore a sequence of seven frames will be sufficient, when the setting is changed immediately after the first image of the sequence is captured.

As mentioned above, the comparison module 12 is connected to the HDR image generation module 11 and thus, the comparison module 12 transmits information on the two images that have been determined to the HDR image generation module 11. The HDR image generation module 11 then retrieves the images from memory 9 and performs an HDR image generation process by combining the two determined images. As a result, image data suitable for further image processing is output and can further be processed just as any single image that is commonly used for obstacle avoidance or grass health recognition.

As mentioned before, the image generation module 7 is also capable of providing the image analyzing means 8 with a single image which is captured by the camera 5 in a regular mode. For doing so, the data that is provided from the camera 5 as a camera image signal may be for example only pre-processed in a pre-processing module 13 before the image data suitable for image analysis are output by the image generation module 7.

The image generation module gives information about the progress of generating the HDR image to the mower movement module in particular if the sequence of images is not completed after certain time. Thus, during the generation process of the HDR image which means that the control system is in the HDR mode, the mower movement module may cause the electric motor 3 to reduce the speed of the autonomous lawn mower. If capturing the series of images that is necessary in order to generate the HDR image takes longer than a predetermined threshold, the mower movement module may even control the motor 3 to completely stop the autonomous lawn mower 1. Such a situation may for example occur in case that the exposure time has to be set extremely long since the dark areas of an image that cause the transition to the HDR mode need an extremely long exposure time.

Figure 4:
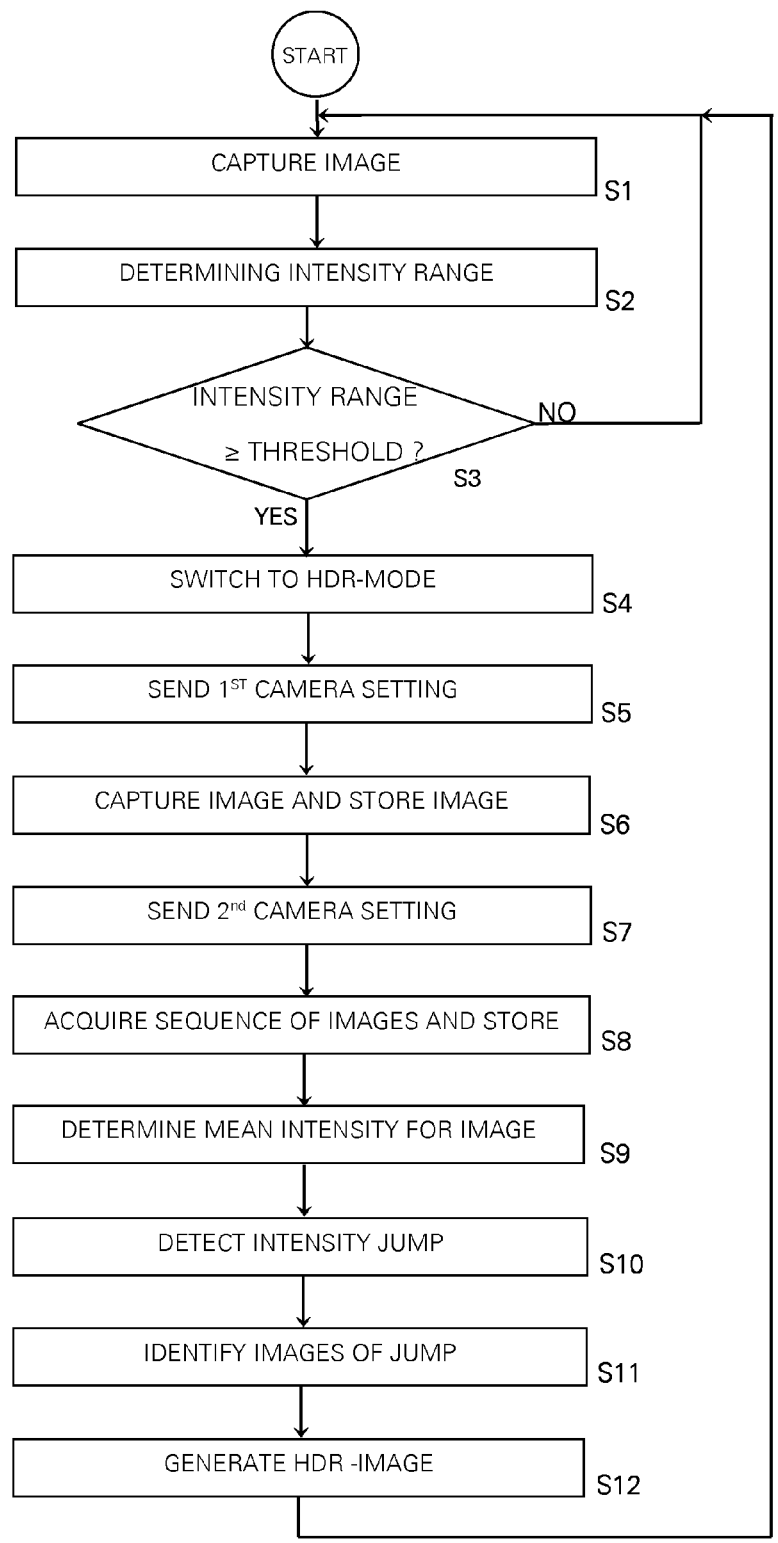
FIG. 4 is a flowchart explaining the steps to generate a HDR image according to the invention.

A method for generating an HDR image according to the present invention in the control system for an autonomous garden tool is shown in FIG. 4. For an explanation it is assumed that the system is in the regular mode and single images are captured 51 by the camera 5 that have a high quality and which can be used directly for image analysis. In the image analysis means 8 there is an intensity range detection module 14 which determines an intensity range within the single images. Thus, in S2 it is determined if the dark areas of the captured image and the bright areas of the image are both suitable for performing an image analysis. If the contrast is too strong, meaning that underexposed and/or overexposed areas are present to such an extent that no meaningful further image processing is possible, it is decided that the control system is switched to an HDR mode in order to ensure an image quality suitable for further processing of the image. Therefore in step S3 the intensity range determined is compared to a threshold in step 53. If the intensity range of the captured image is below the threshold, the control system remains in the regular mode and the next image is captured.

On the other hand if the intensity range is at least equal to or larger than a threshold the control system is switched to the HDR mode in step S4. On the basis of an information according to the dark areas of the image and the bright areas of the image two different camera settings are determined. Then a first camera setting is sent to the camera 5 in step S5. After sending this first setting to the cameras a short delay is performed. This delay is at least as long as the cameras needs for applying the first setting. After such a waiting time a first image of a sequence with the first setting is captured and stored in memory 9.

Immediately after the first image was captured with the first setting the camera 5 is controlled to change to a second camera setting in step S7 and the camera 5 captures images with its highest possible frame rate. Thus, after the first image further images are captured and these images are stored to memory 9. As it was mentioned earlier it is not possible, at least for cheap cameras, to know how many frames it will take exactly until the camera applies the second setting. But for ensuring that the HDR images that are generated by the bracketing technique have a high quality the delay between the two images must be as small as possible. Thus, according to the present invention two consecutive images are determined. This is the reason why not the first taken image is used automatically as the basis for the HDR image generation for which it would be perfectly clear that it was captured using the first setting.

As it was explained before in step S9 the mean intensity for each of the images that is stored in the memory 9 is determined. Each two consecutive images are then compared with respect to their mean intensity values in step S10 so that the last image that was taken with the first setting and the first image that was taken with the second setting are determined. Thus, two consecutive images are available for generating the HDR image and an HDR image with a high quality can be generated.

The HDR mode is only used in case that the intensity range that is detected within a single image lies above a certain threshold. Thus, the transition to the HDR mode is made only in case that the first setting that is for example matched to the dark areas of a single image and the second setting that is adapted to the bright areas of the image differ from each other strongly. Thus, images that are then captured on the basis of the first setting and images that are captured on the basis of the second setting will strongly differ from each other with respect to their mean intensity value. Therefore this mean intensity value jump between two consecutive images can be calculated easily and with a high reliability.

After the pair of consecutive images that has been identified to include the jump in intensity, these images are used to be combined to an HDR image. As long as the system is in the HDR mode the capturing of the sequence of images, the determination of the consecutive images including the change of the settings and the combination of the determined images to an HDR image is repeated. It is particularly preferred that this process is already started again while the further image processing is still going on. The capturing of a new sequence of images may thus be started while the image processing of the last generated HDR image is going on or even while the combination of the two determined images to the HDR image is processed. As soon as the determination of the two consecutive pictures is completed the capturing of a next sequence may therefore be started. For further reducing the time needed or generating an HDR image, it is possible to use the last setting of the previous sequence of images as first setting, so that the initial delay may be avoided. The determination of the two consecutive images may be performed if a jump in the mean intensity values can be detected, independent of the jump is bright to dark or dark to bright.

Although not illustrated in FIG. 4 it is clear that a reduction of the speed of the autonomous lawn mower may for example be coupled to the transition to the HDR mode. Thus, reducing the speed gives the chance to perform the necessary calculations to generate the HDR image so that all the images that are captured as a sequence do not differ from each other too much because of the travelling speed of the lawn mower. Even a complete stop may be performed in case that very strong contrast in a single image leads to a very large exposure time. When the HDR-mode ends also the travelling speed is set back normal.

A decision whether the HDR mode can be stopped can for example be made on an analysis of the two consecutive images. If an evaluation reveals that a single image already includes all information without overexposure or underexposure the HDR mode may be stopped and the system switched back to the regular mode. The intensity range detection module therefore is preferably included also in the image generation module 7.

With the system and method described above it is possible to reduce an image that is the basis for further image processing and analysis even in situations with difficult lighting conditions. The system and method furthermore avoids the use of very expensive HDR senses so that a low cost implementation is possible.

The invention claimed is:

1. A control system for an autonomous garden tool that is equipped with at least one camera and at least one motor, wherein the control system comprises:
    a camera controller configured for controlling camera settings such that the camera can apply a change of camera settings;
    an image generator configured to i) analyze images of a sequence of images, ii) determine, based on the analyzed images, a time on which the change of camera settings is applied by the camera, iii) determine, based on said time, two consecutive images in the sequence of images captured by the camera on the basis of different, respective camera settings, and iv) generate a HDR image on the basis of these two consecutive images in a HDR mode; and
    an image analyzer configured to analyze the HDR image transferred from the image generator,
    the control system being configured to use the HDR image for automatically implementing a function of the autonomous garden tool.

2. The control system according to claim 1, wherein the camera settings that are controlled by the camera controller comprise exposure time and/or gain and/or aperture of the camera.

3. The control system according to claim 1, wherein the camera controller is adapted to control the camera to capture the sequence of images and to change the camera settings while the sequence of images is captured.

4. The control system according to claim 1, wherein the image generator is adapted to determine the two images on the basis of their mean intensity values.

5. The control system according to claim 4, wherein the camera controller is adapted to calculate the mean intensity value for each of the images of the sequence and to compare each two successive images of the sequence until the difference between the mean intensity values of two successive images exceeds a threshold.

6. The control system according to claim 1, wherein the control system further comprises a movement controller for controlling the at least one motor and further adapted to adapt a speed of movement of the autonomous garden tool to a progress in the determination of the two images.

7. The control system according to claim 6, wherein the movement controller is adapted to stop the autonomous garden tool when a time for capturing the sequence of images exceeds a threshold.

8. The control system according to claim 1, wherein the image generator is adapted to determine a contrast in a single captured image and to switch to the HDR mode only when the contrast exceeds a threshold.

9. The control system according to claim 1, wherein the system is adapted to start capturing a new sequence as soon as the two consecutive images of an already captured sequence are determined and further processing of the two determined images and/or the HDR image generated therefrom is performed in parallel with capturing the new sequence.

10. An autonomous lawn mower comprising the control system according to claim 1.

11. A method for generating an image for further image processing in an autonomous garden tool that is equipped with a camera for capturing images, the method comprising the following steps:
    controlling camera settings such that the camera can apply a change of camera settings;
    capturing a sequence of images with different camera settings;
    analyzing images of the sequence of images;
    determining, based on the analyzed images, a time on which the change of camera settings is applied by the camera;
    determining, based on said time, two images out of the sequence of images captured by the camera on the basis of different, respective camera settings by analyzing the images of the sequence of images;
    generating a HDR image on the basis of the two consecutive images using the HDR image for implementing a function of the autonomous garden toot
    analyzing the HDR image; and
    using the HDR image for automatically implementing a function of the autonomous garden tool.

12. The method according to claim 11, wherein the camera settings that are controlled by the camera controller comprise exposure time and/or gain and/or aperture of the camera.

13. The method according to claim 11, wherein the camera controller controls the camera to capture the sequence of images and changes the camera settings while the sequence of images is captured.

14. The method according to claim 11, wherein the image generator determines the two images on the basis of their mean intensity values.

15. The method according to claim 14, wherein the camera controller calculates the mean intensity value for each of the images of the sequence and compares each two successive images of the sequence until the difference between the mean intensity values of two consecutive images exceeds a threshold.

16. The method according to claim 11, wherein the control system further controls a motor of the autonomous garden tool and further adapts a speed of movement of the autonomous garden tool to a progress in the determination of the two consecutive images.

17. The method according to claim 16, wherein the autonomous garden tool is stopped when a time for capturing the sequence of images exceeds a threshold.

18. The method according to claim 11, wherein a contrast in a single captured image is determined and when the contrast is equal to or less than a threshold the single image is used for further image processing.

19. The method according to claim 11, wherein capturing a new sequence of images is started as soon as the two consecutive images of an already captured sequence are determined and the two determined images and/or the HDR image generated therefrom are further processed in parallel with capturing the new sequence.

20. A control system for an autonomous garden tool that is equipped with at least one camera and at least one motor, wherein the control system comprises:

a camera control module for controlling camera settings such that the camera can apply a change of camera settings;

an image generation module configured to i) analyze images of a sequence of images, ii) determine, based on the analyzed images, a time on which the change of camera settings is applied by the camera, iii) determine, based on said time, two consecutive images in the sequence of images captured by the camera on the basis of different, respective camera settings, and iv) generate a HDR image on the basis of these two consecutive images in a HDR mode; and an image analyzer configured to analyze the HDR image transferred from the image generator, the control system being configured to use the HDR image for automatically implementing a function of the autonomous garden tool.

* * * * *